United States Patent [19]
Ohtsuka et al.

[11] 3,955,015

[45] May 4, 1976

[54] METHOD OF MANUFACTURING A TRANSPARENT LIGHT CONDUCTING ELEMENT OF SYNTHETIC RESIN HAVING REFRACTIVE INDEX GRADIENT

[75] Inventors: Yasuji Ohtsuka, Tokyo; Motoaki Yoshida, Takarazuka, both of Japan

[73] Assignee: Nippon Selfoc Co., Ltd., Japan

[22] Filed: Oct. 18, 1973

[21] Appl. No.: 407,625

[30] Foreign Application Priority Data
Oct. 23, 1972  Japan.............................. 47-106387

[52] U.S. Cl................................ 427/163; 260/879; 260/885; 260/886; 526/314; 526/322; 350/96 GN; 350/96 WG; 427/164; 427/256; 427/282; 427/385; 427/400

[51] Int. Cl.²...................... G02B 5/14; B32B 27/02

[58] Field of Search.............. 117/33.3, 138.8, 118; 350/175 NG, 175 GN, 96 R, 96 WG, 96 GN; 351/169; 260/886, 78.5 UA, 885, 879; 427/163, 164, 385, 400, 256, 282

[56] References Cited
UNITED STATES PATENTS

| | | | |
|---|---|---|---|
| 2,331,716 | 10/1943 | Nadeau............................. | 350/164 |
| 2,332,461 | 10/1943 | Muskat..................... | 117/138.8 UA |
| 2,912,418 | 11/1959 | Johnson........................ | 260/78.5 UA |
| 3,083,118 | 3/1963 | Bridgeford.......................... | 117/118 |
| 3,485,556 | 12/1969 | Naujokas........................... | 351/169 |
| 3,658,407 | 4/1972 | Kitano......................... | 350/175 GN |
| 3,801,181 | 4/1974 | Kitano......................... | 350/175 GN |
| 3,816,160 | 6/1974 | Moore......................... | 350/175 GN |
| 3,819,782 | 6/1974 | Irie............................. | 350/175 GN |

OTHER PUBLICATIONS

"Cylindrical Surfaces for Guiding Optical Waves," in *IBM Technical Disclosure Bulletin*, Vol. 13(6), Nov. 1970, p. 1574.

Ohtsuka, "Light Focusing Plastic Rod . . . ," in *Appl. Phys. Lett.*, Vol. 23, No. 5, pp. 247-248, Sept. 1, 1973.

*Primary Examiner*—Ronald H. Smith
*Assistant Examiner*—William H. Schmidt
*Attorney, Agent, or Firm*—Wenderoth, Lind & Ponack

[57] ABSTRACT

A method of manufacturing a light conducting element of synthetic resin in which a continuous change takes place in refractive index from the surface of the element toward its interior, which comprises bringing a transparent solid article of a network polymer which is in the incompletely polymerized state and contains 2 to 80% of a solvent-soluble component, into contact at its surface with a monomer capable of forming a polymer having a different refractive index from the network polymer thereby to cause the diffusion and migration of the monomer into the interior of the article through the contact surface, thereby setting up a gradient in the concentration of the monomer component in the interior of the above article which gradually decreases from the contact surface toward the interior, and simultaneously with, or after, this diffusion step, polymerizing the monomer in the interior of the article and completing the polymerization of the network polymer of the article. The article may be in the form of a fiber, rod, sheet or hollow cylinder.

16 Claims, No Drawings

METHOD OF MANUFACTURING A TRANSPARENT LIGHT CONDUCTING ELEMENT OF SYNTHETIC RESIN HAVING REFRACTIVE INDEX GRADIENT

FIELD OF THE INVENTION

This invention relates to a method of manufacturing a light conducting element of synthetic resin having a gradient in its refractive index.

BACKGROUND OF THE INVENTION

The conventional light conducting elements, e.g., the optical fibers, are composed of a light conducting core element having a relatively high refractive index and a covering layer having a relatively low refractive index, and in these conventional light conducting elements the rays which enter the element at its one end travels through the element while repeating total reflections at the interface of the core element and the covering layer. Either the double pot or other methods are used in covering the light conducting core element having the relatively high refractive index with the covering layer having the relatively low refractive index in making these conventional light conducting elements, with the consequence that there is a tendency to bubble taking place at the interface of the core element and the covering layer as well as the interface becoming unsmooth. And these conditions become the cause of impeding the effective conduction of light.

Again, in the case of the conventional light conducting synthetic resin elements such as described above, since the rays entering at one end of the element travels therethrough while repeating the total reflections, both lagging are set up in the phase velocities of the rays and loss of rays occur due to reflection.

As a proposal to eliminate such drawbacks, there has previously been disclosed in Japanese Patent 651,614 a glass fiber in which a gradual reduction in the refractive index takes place from the central axis to the surface of the fiber.

When a luminous flux enters one end of a light conducting fiber having a distribution of the refractive index which gradually becomes greater from the surface to the interior as disclosed in the aforesaid patent, the luminous flux, which has entered the light conducting element, travels therethrough without being reflected at the surface of the fiber. Hence, it becomes possible to reduce at the emerging end of the fiber the lagging of the phase velocity of the luminous flux, the spread of the luminous flux as well as the loss of light due to reflection. This is the same as the effects that are known as the so-called principles of the gas lens. If the refractive index in the cross-sectional plane of a fiber is so distributed as to be symmetric about the center of the fiber, the lagging of the phase velocity of the luminous flux at the emerging end of the fiber and the spread of the luminous flux can be reduced still further. Hence, this is desirable. Most preferred is the instance where the foregoing refractive index distribution is represented by a secondary curve of the form $$n = n_o (1 - ar^2) \qquad (1).$$

wherein $r$ is the distance of the fiber in the radial direction from its center, $n_o$ is the refractive index at the center of the fiber, $n$ is the refractive index at the point $r$, and $a$ is a positive constant (the foregoing definitions of $r$, $n$, $n_o$ and $a$ applying likewise hereinafter). When light having a given time interval is caused to enter one end of a fiber having this refractive index distribution, the light emerges from the other end of the fiber while retaining its given time interval without lagging of the phase velocity.

When this light conducting fiber is bent, and its radius of curvature exceeds a certain limit, the luminous flux passed through the fiber advances therethrough without reflection.

As is well known, a fiber represented by the foregoing equation (1) and whose length is $t$ has the function of a convex lens having a focal length expressed by the equation $$f = (n_o \sqrt{2a} \sin \sqrt{2a}\, t)^{-1}.$$

On the other hand, a fiber having a length $t$ and a refractive index distribution expressed by the equation $$n = n_o (1 + ar^2) \qquad 2).$$

has the function of a concave lens having a focal length expressed by the equation $$f = (n_o \sqrt{2a} \sinh \sqrt{2a}\, t)^{-1}.$$

OBJECTIVES OF THE INVENTION

An object of the present invention is therefore to provide a light conducting element having a refractive index gradient proceeding from the surface of a fiber to the its interior. Another object resides in eliminating the shortcomings of the conventional methods of manufacturing those optical fibers composed of a light conducting core having a relatively high refractive index and a covering layer having a relatively low refractive index, and to provide optical fibers that do not possess such problems as bubble and unsmoothness at the interface. A still another object is to provide fiber optics whose steps of manufacture are simple and cost of manufacture thereof is small.

A further object of the invention is to provide a new light conducting synthetic fiber element and a method of its manufacture, wherein the shortcomings of the conventional fiber optics have been eliminated as in the case of the hereinabove-noted patent and, at the same time, the optical fiber provided is one which not only is lighter in weight and inexpensive to manufacture than the those made of glass but also is one possessing the advantage of being flexible.

A still further object of this invention is to provide optical fibers of synthetic resin having by itself the functions of a single convex lens or a group of convex lenses or a concave lens.

A further object of the invention is to provide a method of manufacturing a light conducting fiber which by preventing the lagging of the luminous flux at the emerging end of the fiber as well as reflection losses makes it possible to carry out ultrahigh speed light pulse multiple communication.

If a given monomer M, when polymerized, forms a polymer Y, the refractive index of a polymeric mixture or a copolymer (inclusive of the graft copolymers and block copolymers) obtained by polymerizing the monomer M in the presence of a given transparent polymer X (which may be a copolymer) has a value falling between the refractive index of X and that of Y.

Now, when the weight ratios of X and M are varied continuously inside the polymer locally, a refractive index gradient varying continuously in accordance with the foregoing ratios is obtained inside the polymeric mixture or copolymer.

BRIEF SUMMARY OF THE INVENTION

The present invention intends by diffusing and moving a monomer within a polymer to form a concentration gradient of the monomer within the polymer and then by polymerizing (inclusive of copolymerization such as graft and block polymerization) the monomer to thus set up the required refractive index gradient within the polymer.

Accordingly, the present invention is directed to a method of manufacturing a light conducting element of synthetic resin in which a continuous change takes place in the refractive index progressively from the surface of the element to its interior, said method comprising, in combination, the steps of 1. submitting to a prepolymerization reaction a monomer A which can form a transparent network polymer by the polymerization reaction and, before the completion of the polymerization reaction and at a stage wherein 2 – 80 weight % of a solvent-soluble component is contained, interrupting the polymerization reaction to form a prepolymer;

2. imparting a desired form to the prepolymer to obtain an article of the prepolymer;

3. contacting said prepolymer article at at least a part of the surface thereof with a monomer B which forms a transparent finished polymer having a refractive index different from that of the finished polymer obtained from said monomer A to cause the diffusion and migration of the monomer B into the interior of the article via its contact surface, thereby setting up a gradient in the concentration of the monomer B within said article, said concentration gradient being one which gradually decreases from the contact surface to the interior of the article (with the proviso that when a part or all of the diffused monomer has been polymerized, the amount of the monomer B corresponding to that which has been polymerized is included in calculating the concentration); and 4. either subsequent to said contacting step (3) or concurrently therewith, carrying out a postpolymerization step consisting of polymerizing the monomer B present in the article and completing the polymerization of the prepolymer.

DETAILED DESCRIPTION OF THE INVENTION

The invention will now be more fully described below.

The monomer A to be used in the invention method includes those monomers which can form by the polymerization reaction a transparent network polymer. Only one class of monomer or a mixture of two or more monomers can be used. As is well known, the monomers that can form a network polymer are polyfunctional (trifunctional or higher) monomers. However, of these, those monomers which form opaque polymers are excluded. Conveniently usable in this invention as the monomer A are the diallyl esters such as diallyl phthalate, diallyl isophthalate, diallyl terephthalate and diethylene glycol bisallyl carbonate, the unsaturated allyl esters such as allyl methacrylate and allyl acrylate, and the divinyl esters such as divinyl phthalate, divinyl isophthalate and divinyl terephthalate. However, the monomer A is not limited to those mentioned above, and any can be used as long as it is one which forms a transparent network polymer.

Further, as the network polymer usable in the present invention, included are also the homopolymers obtained from the monomers A, such as mentioned above, or the copolymers obtained from two or more of these monomers, as well as the copolymers of these monomers A with a monomer such as styrene, methacrylic ester or vinyl benzoate.

In the method of the present invention, while a prepolymer is formed in the first step by submitting the monomer A to a prepolymerization reaction, it is important that the prepolymer prepared in this prepolymerization reaction is one in which the solvent-soluble component is contained therein in an amount of 2 – 80 weight %, and preferably 30 – 70 weight %, based on the weight of the prepolymer, this being accomplished by interrupting the reaction at a point at which the polymerization reaction has proceeded to certain extent but has not yet proceeded to completion. The amount contained of this solvent-soluble component is measured in the following manner. After molding the polymer to be measured into a rod having a diameter of 1 – 2 mm, the rod is comminuted to a size of about 0.5 mm or less in the state in which the rod is dipped in a suitable solvent, after which the comminuted polymer is allowed to stand in the as-immersed state for 24 hours at a temperature of 15° – 25°C. Then the insoluble matter is separated and the loss in weight is measured. This loss in weight is the amount contained of the solvent-soluble component. If possible, a good solvent for the prepolymer to be measured should preferably be chosen as the foregoing suitable solvent. In the case of the prepolymer prepared from the monomers A hereinbefore illustrated, the use of acetone as the solvent is preferred.

Generally speaking, the amount contained of the solvent-soluble component in the network polymer becomes smaller as the polymerization reaction proceeds, and the network polymer whose polymerization reaction has already been completed is hardly soluble in any solvent at all, the content of the solvent-soluble component being less than 0.5 weight %. This solvent-soluble component is presumed to be composed of the oligomers of low molecular weight, the linear polymers and unreacted monomer.

In the contacting and diffusing step that is carried out in the latter stage of the invention method, a monomer B is brought into contact with the transparent solid article of the network polymer. For effecting the diffusion of the monomer B into the interior of the article at a great speed, the polymeric solid article must contain the solvent-soluble component in an amount in the range of 2 – 80 weight %. While the reason why the diffusion of the monomer is accelerated by the presence of the solvent-soluble component is not exactly clear, it is believed to be in all likelihood to the fact that mutual diffusion takes between the monomer and the solvent-soluble component, with the consequence that this enhances the speed of diffusion of the monomer B. When the content of the solvent-soluble component is less than 2 weight %, this is undesirable, since the speed of diffusion of the monomer B becomes small and the contact time required becomes great. On the other hand, a content of the solvent-soluble component in excess of 80 weight % is also undesirable, since in this case it becomes difficult to retain the polymer in its solid form. A network polymer containing the solvent-soluble component in the range of 2 – 80 weight % is prepared stopping the polymerization of the monomer A at a suitable point, for example, by lowering the temperature to one at which the polymerization reaction stops or by stopping the exposure to light that was being carried out for performing the polymerization reaction.

In the method of this invention, the prepolymer is molded into a suitable form. The molded article of the prepolymer can be of such forms as fibers, rods, sheets, hollow cylinders or other optional shapes. The step of imparting the desired form to the prepolymer may be carried out concurrently with the prepolymerization step or may be carried out subsequent to the prepolymerization step. For instance, if the monomer A is poured into a suitable mold and the prepolymerization reaction is carried out, the prepolymerization and the molding operation can be accomplished at the same time. On the other hand, it is possible to prepare a molding powder of the prepolymer by means of the prepolymerization reaction and thereafter mold this into the form desired by such known molding techniques as either the extrusion or compression molding method. The so obtained transparent solid article is in a gelled state.

The monomer B to be contacted with the transparent gel of the prepolymer in the contacting and diffusing step, the third step of the invention, must be one which, when polymerized, must become a transparent body having either a smaller or larger refractive index than that of the polymer obtained when the polymerization reaction of the monomer A used has been completed. This difference in refractive indices should be at least 0.005. As such a monomer B, that, which on polymerization, forms either a linear polymer or a network polymer will do, conveniently usable being styrene, methacrylic esters, acrylic esters, vinyl acetate, vinyl chloride, acrylonitrile, butadiene, or the mixtures of these.

Examples of preferred combinations of the invention network polymer and monomer B, taking the case where the monomer B becomes a transparent polymer having a smaller refractive index than that of monomer A on completion of the polymerization reaction, are as follows: diallyl phthalate polymer-methyl methacrylate, diallyl phthalate polymer-mixture of methyl acrylate and methyl methacrylate, diallyl isophthalate polymer-methyl methacrylate, copolymer of diallyl phthalate and styrene-methacrylic ester, copolymer of divinyl phthalate and vinyl benzoate-methacrylic ester, copolymer of divinyl isophthalate and vinyl benzoate-methacrylic ester, and copolymer of vinyl benzoate and diallyl isophthalate-methacrylic ester. On the other hand, examples of combinations in which the monomer B becomes a transparent polymer having a greater refractive index than that of monomer A on completion of the polymerization, as noted hereinbefore, include diethylene glycol bisallyl-carbonate polymer-styrene and diethylene glycol bisallyl carbonate polymer-diallyl isophthalate.

In the third step of the invention method, the monomer B is caused to contact either the whole or a part of the surface of the transparent solid article of the prepolymer. This contact is carried out as by dipping the foregoing article in the monomer B. In consequence of this contact, the monomer B is caused to diffuse and migrate into the interior of the aforesaid article via the contact surface of the article, with the consequence that the concentration of the monomer B inside of the foregoing article results in having a gradient in which there is a gradual decreases in the concentration of the monomer B from the contact surface to the interior of the article.

In the case where the prepolymeric article is either of rod or fiber form, the preferred mode is that in which the monomer B makes contact with the whole of the peripheral surface of the article. In this case the monomer B diffuses and migrates from the peripheral surface of the fiber to the center thereof in the radial direction and, as a result, the concentration of the monomer B inside the fiber results in having a gradient that gradually increases from the central axis of the fiber to the peripheral surface thereof.

However, since as hereinafter described, the monomer B is at times polymerized concurrently with its diffusion, the concentration of the monomer B, as here used, denotes, in the case where the whole or a part of the monomer B has been polymerized, a concentration of the monomer B obtained by adding to the unreacted monomer B an amount of the monomer B corresponding to that which has been polymerized.

The contact of the monomer B with said prepolymeric article is carried out at a temperature at which the monomer B can diffuse into the foregoing article, say, a temperature ranging from 5° to 90°C. In proportion as the contact temperature becomes higher, the speed of diffusion of the monomer B becomes greater.

The temperature and time of contact of the monomer B with the foregoing prepolymeric article is determined by the refractive index gradient desired. When this contact temperature and time becomes excessively great, the monomer B becomes diffused in the polymeric article in such a manner that the concentration with the article becomes uniform, and hence, it would not be possible to obtain a refractive index gradient. If this contact time is chosen such that the degree of diffusion of the monomer B reaches to the center of the fiber when contacting the monomer B with the whole of the peripheral surface of the prepolymeric article of fibrous or rodlike form, this fiber, after undergoing the next following postpolymerization step, results in having a refractive index distribution expressed by the hereinbefore given equations (1) to (2) wherein there is either a decrease or increase in the refractive index from the center to the peripheral surface that is nearly proportional to the square of distance in the radial direction from the center of the fiber to the peripheral surface thereof. This fiber then possesses the functions of either a convex or a concave lens.

When the prepolymeric article is of sheet form, a preferred mode of practicing the present invention consists of a method of forming along the surface of a network polymer of sheet form a narrow passage for light consisting of a polymer made from a monomer B having a higher refractive index, thereby producing a light conducting element that can be used in an integrated light circuit. It is known that a light conducting element obtained by providing a narrowly stretched out light passage having a high refractive index along the surface of a transparent base plate having a low refractive index can generally be used as the light conducting element to be used in the so-called integrated light circuit. This type of light conducting element can be made in the following manner according to the invention method. First, a transparent article of the prepolymer molded into sheet form is made by the first and second steps of the present invention. The portions of the surface of the so obtained article other than where the light passage is to be made is then masked with a suitable masking material to ensure that no contact with the masked portion can be made by the monomer B. Next, a monomer B that forms a polymer having a greater refractive index than that of the finished polymer of monomer A is contacted with the surface portion to become the light passage by such methods as painting or dipping, thereby causing the monomer B to diffuse into the interior of the article. This is followed by carrying out the fourth postpolymerization step. Thus, a narrow passage of light having a higher refractive index can be formed along the surface of a network polymer of sheet form.

The postpolymerization step, the fourth step, is the step in which the monomer B, which has been diffused into the interior of the article, is polymerized and, in addition, the polymerization of the prepolymer of the article is completed. While the aforesaid article already has a refractive index gradient as a result of the monomer B diffused therein possessing a concentration gradient, the article cannot be used in this state without further treatment, because disturbance of the refractive index gradient would take place by the further diffusion or evaporation of the monomer B. Hence, the fourth step is necessary. By this fourth step the refractive index gradient is set, and the weatherability of the article is improved. The polymerization of the monomer B within the foregoing article is carried out by bringing the article in conformance with such conditions as will advance the polymerization reaction of the monomer, as by heating the article to the polymerization temperature of the monomer or by exposing the article to light. In like manner, the prepolymer of the foregoing article is brought into conformance with such conditions as will advance its polymerization to complete its polymerization. In carrying out these polymerization reactions by heating, the common practice is to carry out the polymerization of the monomer B and the prepolymer by heating the article once at a temperature close to the polymerization temperatures of the monomer B and the prepolymer, since in most cases the polymerization temperature of the monomer B and that of the prepolymer do not differ greatly.

The transparent prepolymeric solid article containing 2 - 80 weight % of a solvent-soluble component, in consequence of the diffusion of the monomer B in the article and in all likelihood a diffusion which involves the mutual diffusion of the monomer B and the solvent-soluble component, will contain the monomer B and the solvent-soluble component. As a consequent of the fourth step, the monomer B polymerizes and moreover the solvent-soluble component also completes its polymerization to become converted to a solvent-insoluble component. While probably a part of the polymer formed by the monomer B and the network polymer formed by the monomer A is contained in the article as a mutual mixture, it is presumed that in all likelihood that a considerable amount of a copolymer of the monomer A and monomer B is formed, since the solvent-soluble component contains a great number of unsaturated groups.

While the fourth step may be carried out after the third step, a convenient method is to carry out the two steps together. The method of carrying out the third and fourth steps concurrently, i.e., the procedure of diffusing the monomer B into the aforementioned prepolymeric article under conditions which polymerizes the monomer B is a desirable method, since the monomer B diffused into the article is immediately converted to a polymer or a copolymer and sets, with the consequence that it becomes possible to enlarge the concentration gradient. When the third and fourth steps are carried out concurrently, the diffusion of monomer B takes place in accordance with the well-known diffusion equation. However, when the fourth step is carried out subsequent to the third step, the diffusion demonstrates a behavior deviating from the diffusion equation, with the consequence that the concentration gradient and hence the refractive index gradient of the monomer B tend to become close to a flattened form. Hence, this procedure is not desirable when it is intended to obtain a great refractive index gradient.

When an attempt is made to manufacture a light conducting fiber having a refractive index gradient using, instead of the network polymer used in the invention method, a linear polymer not having an unsaturated group, say, by contacting monomeric methyl methacrylate with a polystyrene fiber, there is the shortcoming that there tends to form in the fiber objectionable turbidity, which impairs the transparency of the fiber. The formation of this turbidity is believed to be due to the monomer B (methyl methacrylate) forming high polymeric molecules to cause a phase separation to take place between the linear polymer (polystyrene) and the polymer of the monomer B, with the consequence that light is scattered and turbidity is set up.

On the other hand, when the network polymer was used instead of the linear polymer in the method of the present invention, we found for the first time that unexpected results were obtainable, i.e., there was no formation at all of turbidity. While the reason why the objectionable turbidity is completely prevented in this manner is not entirely clear, conceivable is that the setting up of the phase separation is prevented as a result of the following two reasons: (1) a considerable portion of the monomer B that diffuses into the prepolymer copolymerizes with the prepolymer, and (2) even in the case the monomer B diffusing into the interior of the prepolymer does not copolymerizes with the prepolymer but forms an independent polymer, the size of the molecules of the resulting polymer of the monomer B is considerably smaller than the size of the molecules of the monomer B resulting when a linear polymer is used instead of a network polymer, with the consequence that when the size of the molecules is relatively small as in this case the polymer becomes dispersed inside the network structure of the network polymer.

The following examples are given for more fully illustrating the invention. The symbol $\Delta n$ used in the examples denotes ($n_{center} - n_{periphery}$).

EXAMPLE 1

0.5 % by weight of benzoyl peroxide is added as a polymerization initiator to diallyl phthalate, after which the mixture is held for 16 hours at 80°C., whereupon the polymerization reaction of the diallyl phthalate takes place to a slight degree, and a viscous liquid is obtained. After pouring this liquid into a mold, it is held in its cast state for 5 hours at 80°C., whereupon the polymerization reaction proceeds further to cause the liquid to soldify. On removal of the mold, a diallyl phthalate network polymer molded into a rod form having a diameter of about 3 mm is obtained. This rodlike diallyl phthalate polymer contains 46 % by weight of an acetone-insoluble component. This insoluble component is a polymer in which the diallyl phthalate has been bonded three-dimensionally. This rodlike polymer contains 15 mol % of allyl groups (unsaturated groups), and its refractive index is 1.538. The remaining 54 % by weight of acetone-soluble component consists of oligomers and linear polymers of diallyl phthalate, and unreacted diallyl phthalate. If, instead of holding the aforesaid viscous liquid for 5 hours in its cast state, it is held for more than 15 hours at the same temperature, the conclusion of the polymerization takes place nearly completely. In this case, the acetone-soluble component and the content of the allyl groups become less than 0.5 % by weight and less than 0.3 mol %, respectively, and the refractive index is 1.561.

The rod having a refractive index of 1.538, obtained by holding the viscous liquid in its mold for 5 hours, is dipped in methyl methacrylate containing 4 % of benzoyl peroxide and heated at 80°C. When this state is maintained, the methyl methacrylate gradually becomes viscous and finally solidifies. When a period of about 12 minutes has elapsed after the start of the heating, the rod is removed from the not yet solidified methyl methacrylate. At this stage, the methyl methacrylate monomer has diffused into the interior via the surface of the rod, and a gradient in the concentration of the foregoing monomer which gradually decreases from the surface of the rod in a radial direction towards the center is obtained, and at the same time the polymerization of methyl methacrylate is almost completed. Next, this rod is heated for 10 hours at 75°C. to conclude the polymerization of the methyl methacrylate and diallyl phthalate. The weight of the rod shows a 72 % increase, and a hard, transparent light conducting rod of a diameter of 4 mm and having a convex lens action is obtained.

The refractive indices at the center and surface portions of this rod were 1.560 and 1.521, respectively, and the refractive index distribution N at the several sections was one which satisfies on the whole the aforementioned equation (1), the value of $a$ in the equation being 0.062 mm$^{-2}$. This rod is cut, and the ends of the rod are polished smoothly to obtain a rodlike lens having a length of 3.0 mm.

This lens was found to be a lens having a convex lens action and a focal length of 2.0 mm. Further, when puls of laser beam was passed through from one end of the foregoing rod having a length of about one meter, it was confirmed to advance through the rod without lagging of the phase velocity of light.

On the other hand, when the aforementioned rod obtained by holding the rod in the mold for 15 hours and containing 0.5 % by weight of the acetone-soluble component is dipped in methyl methacrylate under the same conditions as those indicated hereinabove, the speed of diffusion of the methyl methacrylate is small, with the consequence that the polymerization of the methyl methacrylate takes place before sufficient diffusion of the methyl methacrylate occurs. Hence, the required refractive index distribution could not be obtained.

EXAMPLE 2

A rodlike polymer of diallyl phthalate containing 46 % by weight of an acetone-insoluble component and of a diameter of 3 mm, prepared by the same procedure as that described in Example 1, is dipped in a 5/1 (weight ratio) methyl acrylate-methyl methacrylate mixture containing 0.5 % of benzoyl peroxide and heated at 60°C. Forty-three minutes later the rodlike polymer is removed from the mixture and heated for 10 hours at 70°C. to conclude its polymerization. The rodlike polymer shows an 87.3 % increase in weight. Thus is obtained a highly flexible, transparent light conducting element having a diameter of 4 mm. This light conducting element has a concave lens action. And in this case, the difference in the refractive indices between the center and peripheral portions $\Delta n$ was 0.034.

EXAMPLE 3

Four grams of benzoyl peroxide is added to 100 grams of diallyl isophthalate, and the mixture is heated for 110 minutes at 80°C. followed by pouring the mixture into a mold to obtain a rodlike polymer of diallyl isophthalate having a diameter of about 3 mm. The so obtained polymer contains 25.5 % by weight of an acetone-insoluble component (31.4 mol % of allyl groups remaining), and its refractive index is about 1.541. Now, if this rod is heated further and its polymerization is concluded, its refractive index becomes 1.570.

The foregoing molded rodlike polymer having a refractive index of 1.541 is dipped in methyl methacrylate containing 2.91 % of benzoyl peroxide and heated for 5 minutes at 80°C. As a consequence, there is a 12.7 % increase in the weight of the rodlike polymer, and a hard, transparent light conducting element of a diameter of 4 mm and having a convex lens action is obtained. Its optical path period was 50 mm, the $\Delta n$ was 0.037, and the flexural elasticity was $0.92 \times 10^4$ kg/cm$^2$.

EXAMPLE 4

3 % of benzoyl peroxide is added to diethylene glycol bisallyl carbonate, after which the resulting mixture is heated for 1 hour and 45 minutes at 80°C. and then molded to obtain a rodlike polymer having a diameter of about 3.5 mm. The acetone-insoluble component of this polymer is 47.8 %, and its refractive index is about 1.474. Incidentally, if this rodlike polymer is heated further and polymerized, its refractive index becomes 1.498.

This rod having a refractive index of 1.474 is dipped in methyl acrylate containing 1 % of azoisobutyronitrile and heated at 60°C. Immediately, before the temperature of the methyl acrylate makes an abrupt rise due to its polymerization, i.e., about 15 minutes after the heating is started, the rodlike polymer is removed. Thus is obtained a highly flexible light conducting element of 4.6 mm in diameter having a high degree of transparency and whose weight has increased by 71.1 %. This light conducting element has a convex lens action. Its $\Delta n$ was 0.0132.

When styrene containing 1 % of azoisobutyronitrile is used instead of the methyl acrylate in the aforeaid contacting and diffusing step, after which the rod is heated for one hour at 90°C., a light conducting element having a diameter of about 4 mm whose weight has increased by 51 % and having a concave lens action is obtained. In this case, the $\Delta n$ was about −0.02.

EXAMPLE 5

To a powdery prepolymer, which is a linear polymer of diallyl phthalate, is added 20 % of diallyl isophthalate containing 3 % of benzoyl peroxide, after which the mixture is compression molded at 100°C. and 20 kg/cm² to obtain a rod of a network polymer having a diameter of about 3 mm. This contains 42.4 % by weight of an acetone-insoluble component. This rod is dipped in butyl methacrylate containing 2 % of benzoyl peroxide and heated for 30 minutes at 70°C. As a result, a 15.2 % increase in weight takes place, and a transparent and flexible light conducting element of 3.2 mm in diameter having a convex lens action is obtained. The $\Delta n$ of this light conducting element was 0.003.

EXAMPLE 6

0.3 Gram of benzoyl peroxide is dissolved in 7.5 grams of vinyl benzoate and 2.5 grams of diallyl isophthalate, after which the mixture is heated for 20 minutes at 80°C. in a polypropylene tube. The content of the tube is then extruded to obtain a prepolymeric rod having a diameter of 3 mm. This rod is composed of 21.0 % of a network polymer, 5.7 % of a linear polymer and 73.3 % of unreacted monomer.

The prepolymeric rod is dipped in methyl methacrylate containing 2 % by weight of benzoyl peroxide and heated for 20 minutes at 80°C. The rod is then removed from the methyl methacrylate and heat treated for 14 hours at 70°C. to obtain a light conducting element of 3.5 mm in diameter having a convex lens action. The $\Delta n$ was 0.068.

What is claimed is:

1. A method of manufacturing a transparent light conducting element of synthetic resin in which a continuous change takes place in the refractive index progressively from the surface of the element to its interior, said method comprising, in combination, the steps of
   1. submitting a monomer A to a prepolymerization reaction, said monomer A being one that can form a transparent network polymer by the polymerization reaction, and before completion of the polymerization reaction and at a stage wherein 2 – 80% by weight of a solvent-soluble component is contained, interrupting the polymerization reaction to form a prepolymer;
   2. imparting a desired form to the prepolymer to obtain an article thereof having a uniform refractive index;
   3. contacting for a predetermined time said prepolymeric article on at least a part of the surface thereof with a monomer B, said monomer B being one which forms a transparent completely polymerized polymer having a refractive index different from that of the completely polymerized polymer formed from said monomer A, said predetermined time being selected such that a gradient in the concentration of the monomer B diffused within said article is set up, said concentration gradient being one which gradually decreases from the contact surface to the interior of the article, wherein when a part or all of the diffused monomer has been polymerized, the amount of the monomer B corresponding to that which has been polymerized being included in calculating the concentration; and
   4. carrying out a postpolymerization step consisting of polymerizing the monomer B present in the article and completing the polymerization of the prepolymer, whereby said gradient in the concentration of the monomer B forms said continuous change of the refractive index without causing objectionable turbidity, concurrently with step (3).

2. The method of claim 1 wherein said monomer A is at least one monomer selected from the group consisting of diallyl phthalate, unsaturated acid allyl esters, and divinyl esters.

3. The method of claim 1 wherein said solvent-soluble component is contained in an amount of 30 – 70 % by weight.

4. The method of claim 1 wherein said desired form is a fiber, rod, sheet or hollow cylinder.

5. The method of claim 1 wherein the difference in the refractive indices of the finished polymer of said monomer A and the finished polymer of said monomer B is at least 0.005.

6. The method of claim 1 wherein said monomer B is at least one monomer selected from the group consisting of styrene, methacrylic esters, acrylic esters, vinyl acetate, vinyl chloride, acrylonitrile and butadiene.

7. The method of claim 1, wherein said desired form is that of a fiber or a rod, and which comprises contacting said monomer B with the whole of the outer peripheral surface of said fibrous or rodlike prepolymeric article, the time of contact being so chosen that the migration of the monomer B takes place towards the center of the article, whereby the finally obtained synthetic resin light conducting element has a lens action and a refractive index distribution which varies from the center of the element to the peripheral surface thereof at a rate nearly proportional to the square of the distance in a radial direction from the center.

8. The method of claim 1, wherein said network polymer of the monomer A and the monomer B are selected from the combinations of diallyl phthalate polymer-methyl methacrylate, diallyl phthalate polymer-mixture of methyl acrylate and methyl methacrylate, diallyl isophthalate polymer-methyl methacrylate, copolymer of diallyl phthalate and styrene-methacrylic ester, copolymer of diallyl isophthalate and styrene-acrylic ester, copolymer of divinyl phthalate and vinyl benzoate-methacrylic ester, copolymer of divinyl isophthalate and vinyl benzoate-methacrylic ester, copolymer of vinyl benzoate and diallyl isophthalate-methacrylic ester, diethylene glycol bisallyl carbonate polymer-styrene and diethylene glycol bisallyl carbonate polymer-diallyl isophthalate.

9. A method of manufacturing a transparent light conducting element of synthetic resin in which a continuous change takes place in the refractive index progressively from the surface of the element to its interior, said method comprising, in combination, the steps of:
   1. submitting a monomer A to a prepolymerization reaction, said monomer A being one that can form a transparent network polymer by the polymerization reaction, and before completion of the polymerization reaction and at a stage wherein 2-80% by weight of a solvent-soluble component is contained, interrupting the polymerization reaction to form a prepolymer;
   2. imparting a desired form to the prepolymer to obtain an article thereof having a uniform refractive index;
   3. contacting for a predetermined time said prepolymeric article on at least a part of the surface thereof with a monomer B, said monomer B being one which forms a transparent completely polymerized polymer having a refractive index different from that of the completely polymerized polymer formed from said monomer A, said predetermined time being selected such that a gradient in the concentration of the monomer B diffused within said article is set up, said concentration gradient being one which gradually decreases from the contact surface to the interior of the article, wherein when a part or all of the diffused monomer has been polymerized, the amount of the monomer B corresponding to that which has been polymerized being included in calculating the concentration; and 4. carrying out a postpolymerization step consisting of polymerizing the monomer B present in the article and completing the polymerization of the prepolymer, whereby said gradient in the concentration of the monomer B forms said continuous change of the refractive index without causing objectionable turbidity, subsequent to step (3).

10. The method of claim 9 wherein said monomer A is at least one monomer selected from the group consisting of diallyl phthalate, unsaturated acid allyl esters, and divinyl esters.

11. The method of claim 9 wherein said solvent-soluble component is contained in an amount of 30–70% by weight.

12. The method of claim 9 wherein said desired form is a fiber, rod, sheet or hollow cylinder.

13. The method of claim 9 wherein the difference in the refractive indices of the finished polymer of said monomer A and the finished polymer of said monomer B is at least 0.005.

14. The method of claim 9 wherein said monomer B is at least one monomer selected from the group consisting of styrene, methacrylic esters, acrylic esters, vinyl acetate, vinyl chloride, acrylonitrile and butadiene.

15. The method of claim 9 wherein said desired form is that of a fiber or a rod, and which comprises contacting said monomer B with the whole of the outer peripheral surface of said fibrous or rodlike prepolymeric article, the time of contact being so chosen that the migration of the monomer B takes place towards the center of the article, whereby the finally obtained synthetic resin light conducting element has a lens action and a refractive index distribution which varies from the center of the element to the peripheral surface thereof at a rate nearly proportional to the square of the distance in a radial direction from the center.

16. The method of claim 9 wherein said network polymer of the monomer A and the monomer B are selected from the combinations of diallyl phthalate polymer-methyl methacrylate, diallyl phthalate polymer-mixture of methyl acrylate and methyl methacrylate, diallyl isophthalate polymer-methyl methacrylate, copolymer of diallyl phthalate and styrene-methacrylic ester, copolymer of diallyl isophthalate and styrene-acrylic ester, copolymer of divinyl phthalate and vinyl benzoate-methacrylic ester, copolymer of divinyl isophthalate and vinyl benzoate-methacrylic ester, copolymer of vinyl benzoate and diallyl isophthalate-methacrylic ester, diethylene glycol bisallyl carbonate polymer-styrene and diethylene glycol bisallyl carbonate polymer-diallyl isophthalate.

* * * * *